(12) United States Patent
Ottaviani et al.

(10) Patent No.: US 10,808,587 B2
(45) Date of Patent: Oct. 20, 2020

(54) EXHAUST LINE, EXHAUST GAS PURIFICATION DEVICE, AND PURIFICATION DEVICE MANUFACTURING PROCESS

(71) Applicant: FAURECIA SYSTEMES D'ECHAPPEMENT, Nanterre (FR)

(72) Inventors: Eric Ottaviani, Beaucourt (FR); Jean-Paul Brunel, Meslieres (FR)

(73) Assignee: FAURECIA SYSTEMES D'ECHAPPEMENT (FR)

( * ) Notice: Subject to any disclaimer, the term of this patent is extended or adjusted under 35 U.S.C. 154(b) by 3 days.

(21) Appl. No.: 16/299,452

(22) Filed: Mar. 12, 2019

(65) Prior Publication Data
US 2019/0316507 A1    Oct. 17, 2019

(30) Foreign Application Priority Data
Apr. 11, 2018   (FR) ...................... 18 53167

(51) Int. Cl.
| | |
|---|---|
| *F01N 3/027* | (2006.01) |
| *F01N 3/20* | (2006.01) |
| *B01D 53/94* | (2006.01) |
| *B01D 46/00* | (2006.01) |
| *F01N 3/28* | (2006.01) |

(52) U.S. Cl.
CPC ....... *F01N 3/2013* (2013.01); *B01D 46/0027* (2013.01); *B01D 46/0063* (2013.01); *B01D 53/94* (2013.01); *F01N 3/027* (2013.01); *F01N 3/2803* (2013.01); *F01N 2240/16* (2013.01); *F01N 2510/06* (2013.01)

(58) Field of Classification Search
CPC ..... F01N 3/027; F01N 3/2013; F01N 2240/16
See application file for complete search history.

(56) References Cited

FOREIGN PATENT DOCUMENTS

| | | |
|---|---|---|
| JP | H09317440 A | 12/1997 |
| WO | 2004112433 A1 | 12/2004 |

OTHER PUBLICATIONS

Machine translation of JP H09-317440 A, accessed May 11, 2020. (Year: 2020).*
French Search Report for French Application No. 18 53167 dated Sep. 14, 2018.

* cited by examiner

*Primary Examiner* — Jonathan R Matthias
(74) *Attorney, Agent, or Firm* — Carlson, Gaskey & Olds, P.C.

(57) ABSTRACT

An exhaust gas purification device for a vehicle includes a tubular enclosure having a central axis, a purification member for exhaust gases housed in the tubular enclosure, an electric heating member housed in the tubular enclosure, and a power source electrically powering the electric heating member. The electric heating member comprises a heating plate made from an electrically conductive material extending in a plane substantially perpendicular to the central axis. The heating plate has a solid center and at least two branches, each branch extending in a spiral from the solid center to a free end located near the tubular enclosure. The heating plate is permeable to the exhaust gases and comprises a network of passages for the exhaust gas generating a turbulent flow of the exhaust gases through the heating plate.

23 Claims, 6 Drawing Sheets

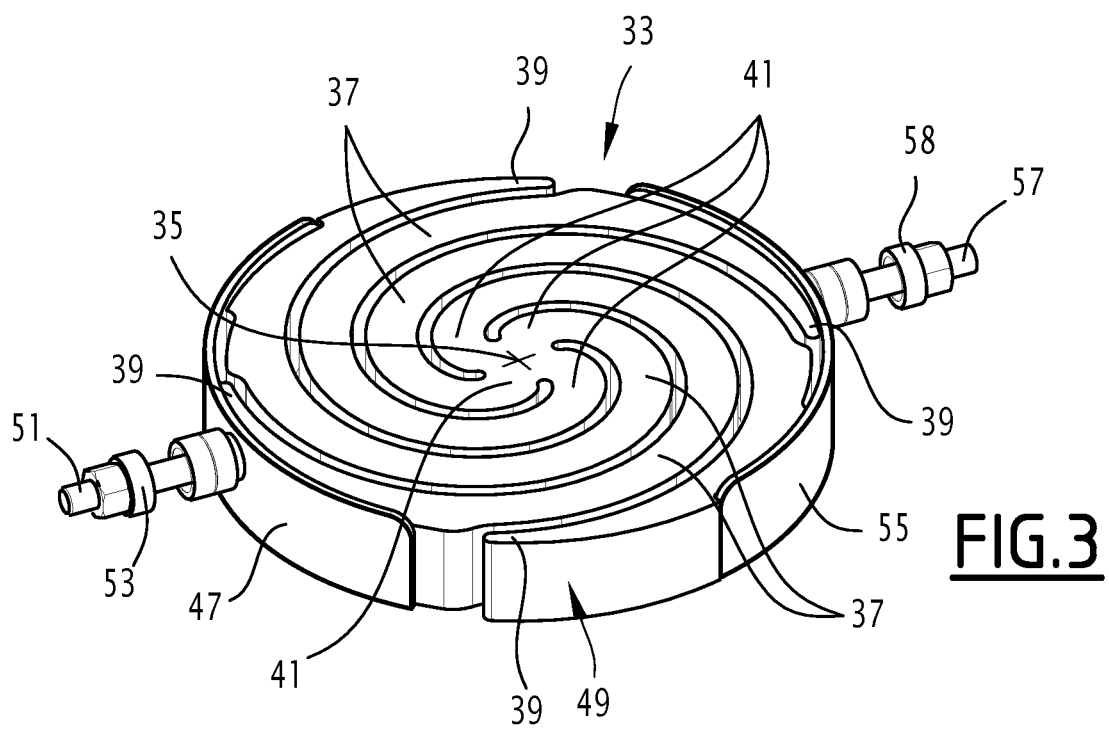
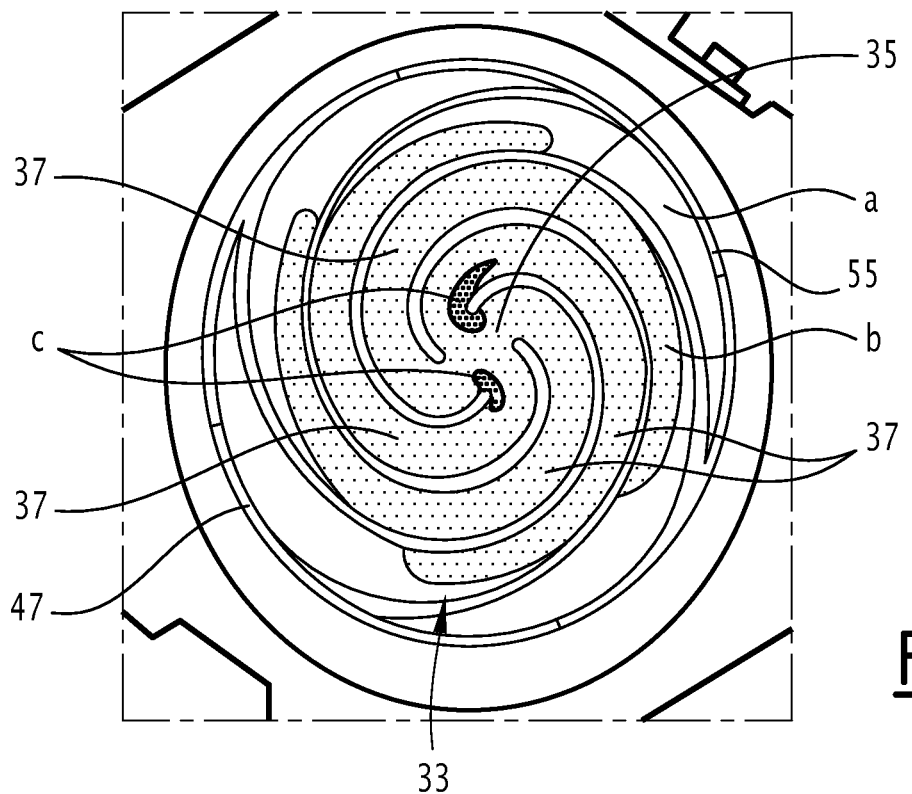

EXHAUST LINE, EXHAUST GAS PURIFICATION DEVICE, AND PURIFICATION DEVICE MANUFACTURING PROCESS

CROSS-REFERENCE TO RELATED APPLICATIONS

This application is a U.S. non-provisional application claiming the benefit of French Patent Application No. 18 53167, filed on Apr. 11, 2018, which is incorporated herein by its entirety.

FIELD OF INVENTION

The present invention relates to vehicle exhaust gas purification devices, equipped with heating members.

BACKGROUND OF THE INVENTION

It is possible to make the heating member by using metal sheets, superimposed parallel to one another and rolled, as proposed by DE102007010758.

Such a heating member channels the exhaust gases in a laminar flow. This does not promote heat transfer from the heating member to the exhaust gases.

Furthermore, the heating member is not very rigid, and must be fastened at multiple points on the purification member. These fastening points are typically rods secured to the heating member and engaged in the channels of the purification member. This makes the use of a ceramic purification member problematic due to its fragility and requires that the latter be made from metal, the cost of which is higher compared to a ceramic purification member.

In this context, the invention aims to propose a purification device that does not have the above flaws.

SUMMARY OF THE INVENTION

An exhaust gas purification device for a vehicle comprises a tubular enclosure having a central axis, a purification member for the exhaust gases housed in the tubular enclosure, an electric heating member housed in the tubular enclosure, and a power source electrically powering the heating member. The heating member comprises a heating plate made from an electrically conductive material extending in a plane substantially perpendicular to the central axis, the heating plate having a solid center and at least two branches, each branch extending in a spiral from the solid center to a free end located near the tubular enclosure. The heating plate is permeable to the exhaust gases and comprises a network of passages for the exhaust gas, which generates a turbulent flow of the exhaust gases through the heating plate.

The use of a heating plate made from an electrically conductive material, comprising a network of passages for the exhaust gas generating a turbulent flow of exhaust gases through the heating plate, makes it possible to facilitate heat transfer between the heating member and the exhaust gases. The power of the heating member can be decreased, which allows lower electricity consumption.

The heating plate can be obtained directly by cutting from a single-piece plate. Its manufacturing is therefore cost-effective.

The heating plate is rigid enough to be fastened only by its edges. The plate is not required to bear fasteners distributed over its entire surface. Mounting is therefore made easier. Furthermore, it becomes possible to use a ceramic purification member, since the latter is no longer required to bear the fasteners of the heating member.

The use of branches extending in a spiral from the solid center to a free end located near the tubular enclosure makes it possible to obtain the desired length for the travel of the electric current, and therefore the required heating power, while distributing the heat contribution in the section of the tubular enclosure. The spiral shape also makes it possible to absorb the heat expansion without creating too many stresses in the plate.

The purification device may also have one or more of the features below, considered individually or according to all technically possible combinations:
- the heating plate comprises at least three branches each extending in a spiral from the solid center to a free end located near the tubular enclosure;
- the heating plate is integrally formed;
- the heating plate is a foam;
- the heating plate has a thickness comprised between 2 and 50 mm;
- the heating plate comprises exactly two branches, each branch winding over at least 360° around the solid center;
- the heating plate comprises exactly four branches, each branch winding over at least 180° around the solid center;
- the heating plate is coated with at least one coating with a catalytic function making it possible to contribute to the post-treatment of the exhaust gases.

According to a second aspect, the invention relates to a method for manufacturing the purification device having the above features and including the following steps:
- obtaining a plate made from said electrically conductive material;
- cutting the plate to form the heating plate.

According to a third aspect, the invention relates to an exhaust line including a purification device having the above features.

BRIEF DESCRIPTION OF THE DRAWINGS

Other features and advantages will emerge from the detailed description given below, by way of indication and without limitation, with reference to the annexed Figures, including:

FIG. 3 is a perspective view of the heating member of FIG. 1, with a different power source from that of FIG. 2;

FIG. 4 is a perspective view of the heating member of FIG. 3 during operation, showing the temperature levels of different zones of the heating plate;

DETAILED DESCRIPTION

Figure 1:
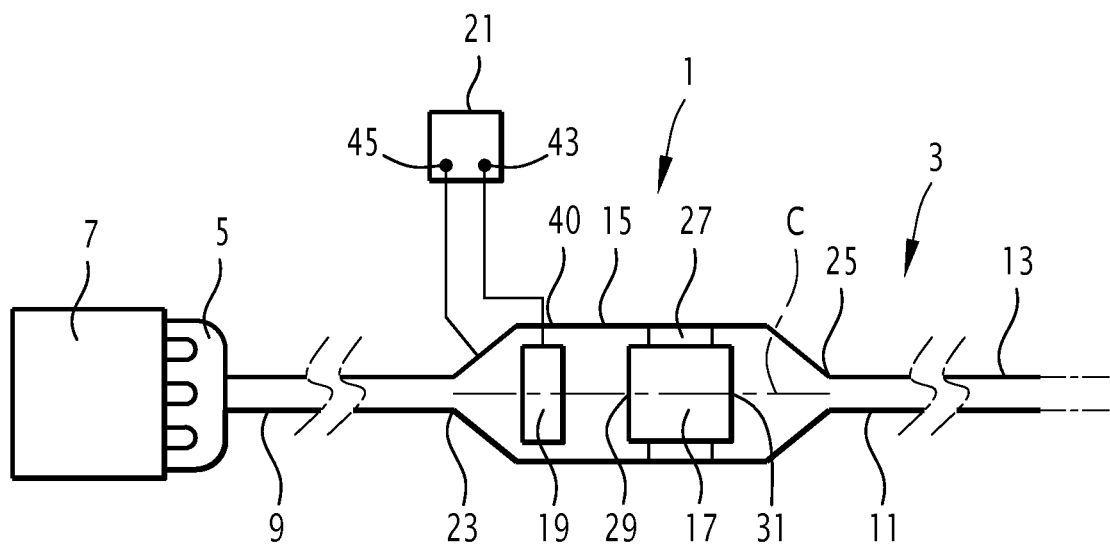
FIG. 1 is a simplified schematic illustration of an exhaust line including a purification device according to the invention.

The purification device 1 schematically shown in FIG. 1 is provided to purify exhaust gases from a vehicle, typically exhaust gases from a car or truck.

It is inserted in the exhaust line 3 of the vehicle. The latter comprises an exhaust manifold 5 collecting the exhaust gases leaving combustion chambers of the heat engine 7 of the vehicle.

The purification device 1 is fluidly connected to the manifold 5 by an upstream pipe 9, on which other pieces of equipment are typically inserted, such as a turbocompressor.

In the downstream direction, the purification device 1 is fluidly connected by a downstream pipe 11 to a nozzle 13. Other pieces of equipment, such as mufflers or other purification equipment, are inserted between the purification device 1 and the nozzle 13. The purified exhaust gases are released into the atmosphere through the nozzle 13.

The purification device 1 comprises a tubular enclosure 15 having a central axis C, a purification member 17 for the exhaust gases housed in the tubular enclosure 15, an electric heating member 19 housed in the tubular enclosure 15, and a power source 21 electrically powering the heating member 19.

The tubular enclosure 15 has an exhaust gas inlet 23 and outlet 25, which are respectively connected to the upstream 9 and downstream 11 pipes.

The tubular enclosure 15 has any appropriate shape.

The purification member 17 is, for example, an SCR catalyst, a three-way catalyst, an oxidation catalyst, or a NOx trap.

As shown in FIG. 1, a maintaining web 27 is inserted between the purification member 17 and the tubular enclosure 15.

Typically, one or several purification members are placed in the tubular enclosure 15.

The heating member 19 is advantageously placed opposite and close to the inlet face 29 of the purification member 17. Alternatively, the heating member 19 is placed opposite and close to the outlet face 31 of the purification member 17, i.e., downstream from the latter. The inlet 29 and outlet 31 faces are the faces by which the exhaust gases enter and leave the purification member 17.

Alternatively, the heating member 19 is placed at a distance upstream from the purification member 17.

Figure 2:
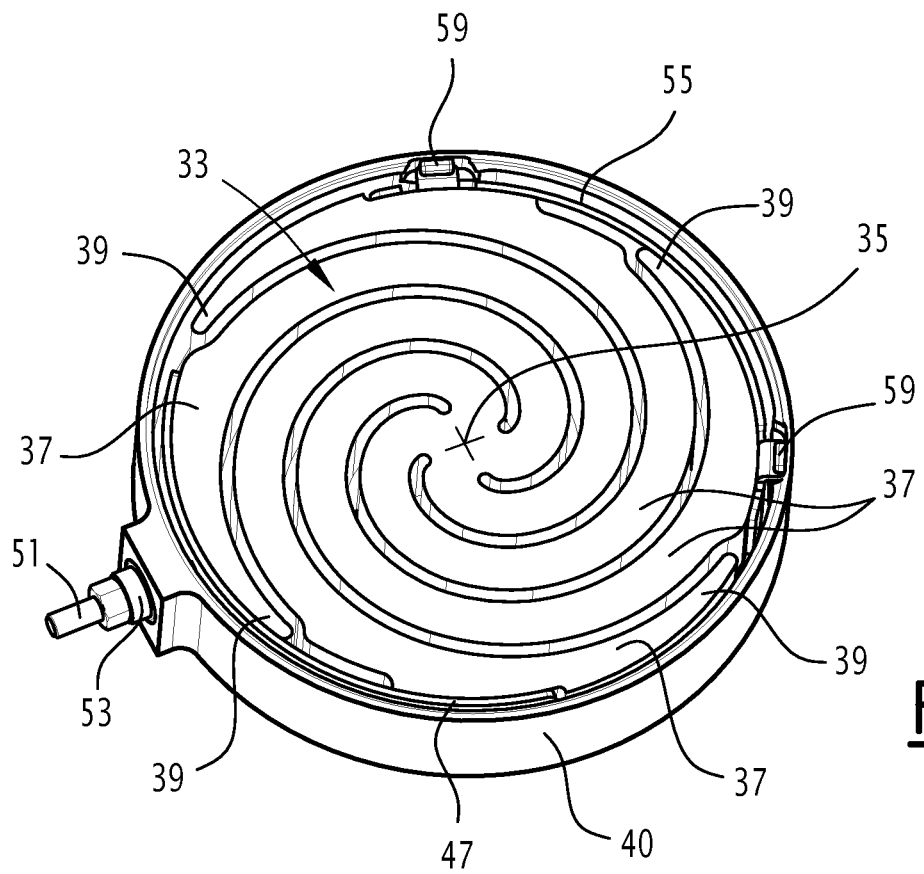
FIG. 2 is a perspective view of the heating member of FIG. 1, mounted in the enclosure of the purification member.

As shown by FIG. 2, the heating member 19 comprises a heating plate 33 made from an electrically conductive material, extending in a plane substantially perpendicular to the central axis C.

Typically, the heating plate 33 heats by Joule effect.

The heating plate 33 is permeable to the exhaust gases. It comprises a network of passages for the exhaust gases, generating a turbulent flow of exhaust gases through the heating plate 33.

The material making up the heating plate 33 is typically a metal, such as stainless steel, or a metal alloy, or a ceramic. For example, this material is an iron alloy, such as FeCrAl. Alternatively, this material is a nickel or copper alloy, such as NiCr. According to another alternative, this material is a silicon carbide SiC ceramic.

The heating plate 33 is typically a foam, with open pores organized randomly or regularly.

Alternatively, the heating plate 33 is a metal mesh.

The pore density is typically between 5 ppi (pores per inch) and 40 ppi. The material typically has a developed surface of between 500 and 5000 m2/m3, preferably between 1000 and 3000 m2/m3, and still more preferably between 1500 and 2500 m2/m3.

Advantageously, the heating plate 33 is coated with at least one coating with a catalytic function making it possible to contribute to the post-treatment of the exhaust gases. This coating may be provided for the oxidation and/or reduction of the polluting compounds of the exhaust gases. It may, for example, be of the same type as those used in TWC (Three-way Catalyst), DOC (Diesel Oxydation Catalysis), PNA (Passive NOx Absorber), LNT (Lean NOx Trap), SCR (Selective Catalytic Reduction), or for the hydrolysis of a reducing agent used to reduce nitrogen oxides.

Alternatively or additionally, this coating is provided to increase the roughness of the surface of the material, in order to promote turbulence and therefore heat exchanges.

Due to its porosity, the heating plate 33 also acts as particle filter. The heating plate 33 is regenerated upon each heating, the trapped soot particles being eliminated.

Advantageously, the heating plate 33 is integrally formed. It is in one piece, made from the same material.

Typically, the heating plate 33 is obtained by cutting a plate made from a single piece of the electrically conductive material.

Alternatively, the heating plate 33 is obtained by casting, extrusion, sintering, additive manufacturing (3D printing), etc.

The heating plate 33 has a thickness of between 2 and 50 mm, preferably between 5 and 30 mm, and still more preferably between 10 and 20 mm.

In other words, the heating plate 33 assumes the form of a slice of electrically conductive material, cut directly to the desired shape.

Advantageously, the heating plate 33 has a solid center 35 and at least two branches 37, each branch 37 extending in a spiral from the solid center 35 to a free end 39 located near the tubular enclosure 15.

The solid center 35 is typically located on the central axis C.

The heating plate 33 typically comprises at least three branches 37 each extending in a spiral from the solid center 35 to a free end 39 located near the tubular enclosure 15, for example four or more branches 37.

The branches 37 all wind in the same direction around the solid center 35. They are separated from one another by narrow interstices, for example with a width smaller than 50%, preferably 25%, of the width of a branch 37.

Advantageously, the width of the interstice is as small as possible, such as smaller than 5 mm, preferably smaller than 3 mm, and still more preferably smaller than 2 mm.

Typically, the branches 37 all have the same shape, the position of one branch 37 being deduced from the position of another branch 37 by rotation around the solid center 35.

The heating plate 33 is mounted in a segment 40 of the tubular enclosure 15. The free ends 39 of the branches 37 each have a bowed shape, with a curve substantially identical to that of the segment 40. They therefore extend parallel and close to the inner surface of the segment 40. They are, for example, separated by an interstice with a width smaller than 5 mm from said inner surface. Preferably, the free ends 39 of the branches 37 are separated by an interstice with a width smaller than 3 mm, and still more preferably smaller than 2 mm, from said inner surface.

Thus, the heating plate 33 substantially occupies the entire free section of the segment 40 of the tubular enclosure 15, perpendicular to the central axis C, such that the majority of the exhaust gas is forced to pass through the heating plate 33.

In the alternative embodiment shown in FIGS. 2 to 4, the heating plate 33 comprises exactly four branches 37. In this case, each branch 37 winds at least over 180° around the solid center 35, preferably over at least 270°, still more preferably over at least 360° around the solid center 35.

The inner ends 41 of the four branches 37, connected to the solid center 35, are arranged at 90° from one another. The two inner ends 41 opposite one another are therefore arranged in the extension of one another, which favors the flow of the electrical current from one toward the other.

Figure 5:
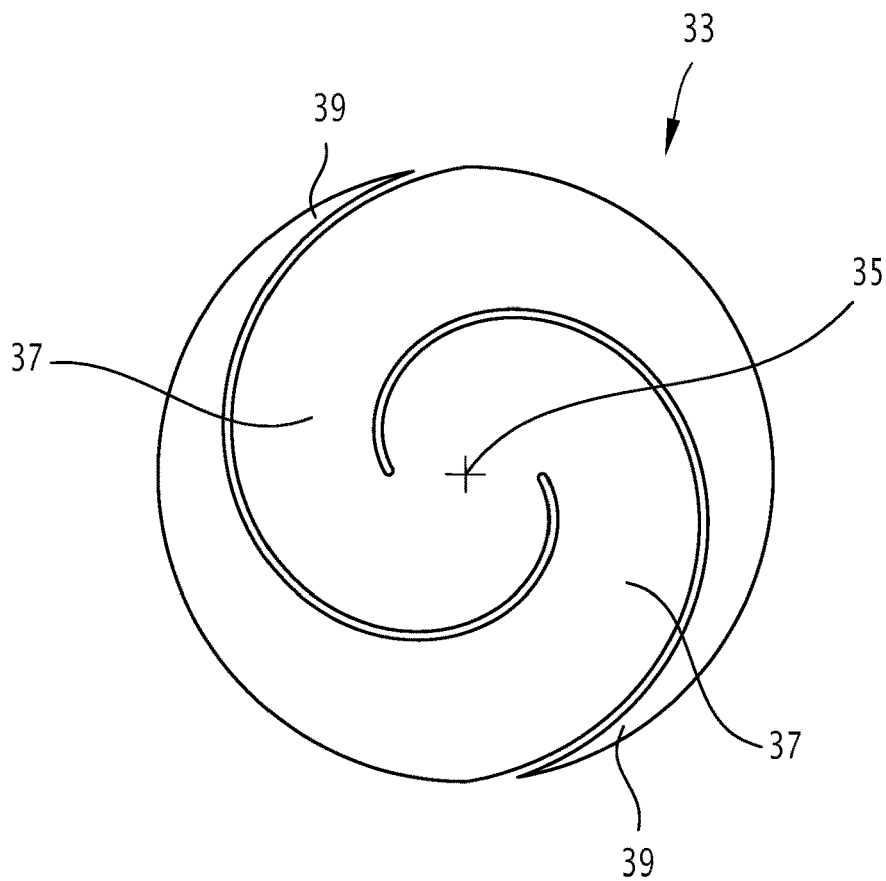
FIG. 5 is a top view of a heating plate according to a variant that is less advantageous than that of FIGS. 2 to 4.
Figure 6:
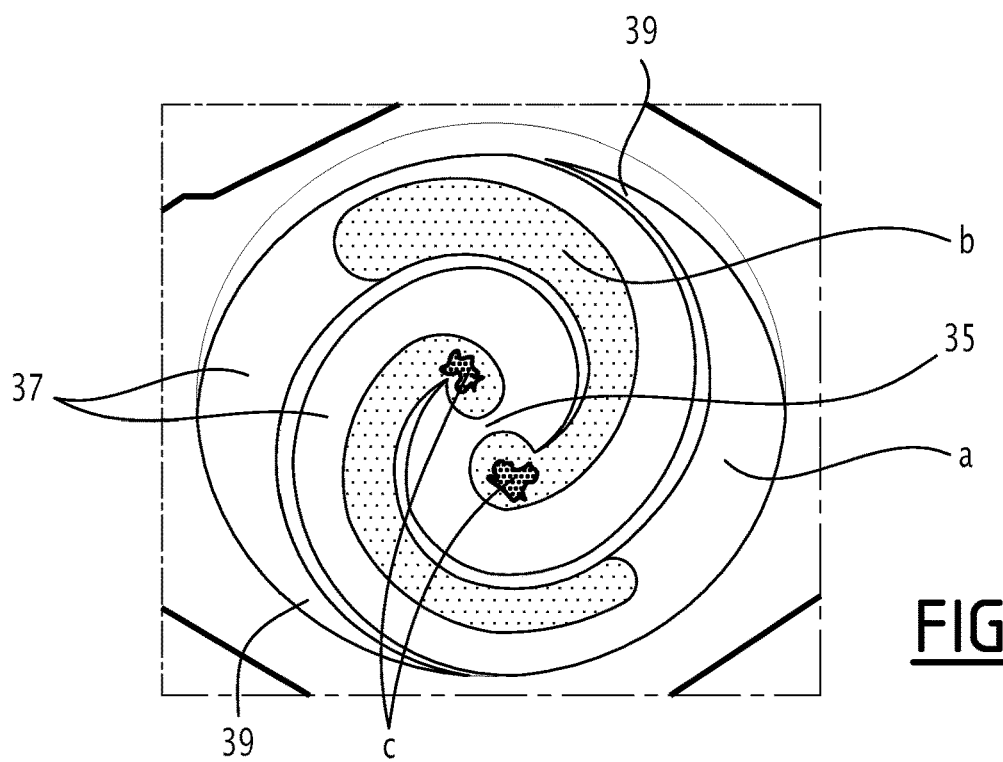
FIG. 6 is a view similar to that of FIG. 4, for the heating plate of FIG. 5.
Figure 7:
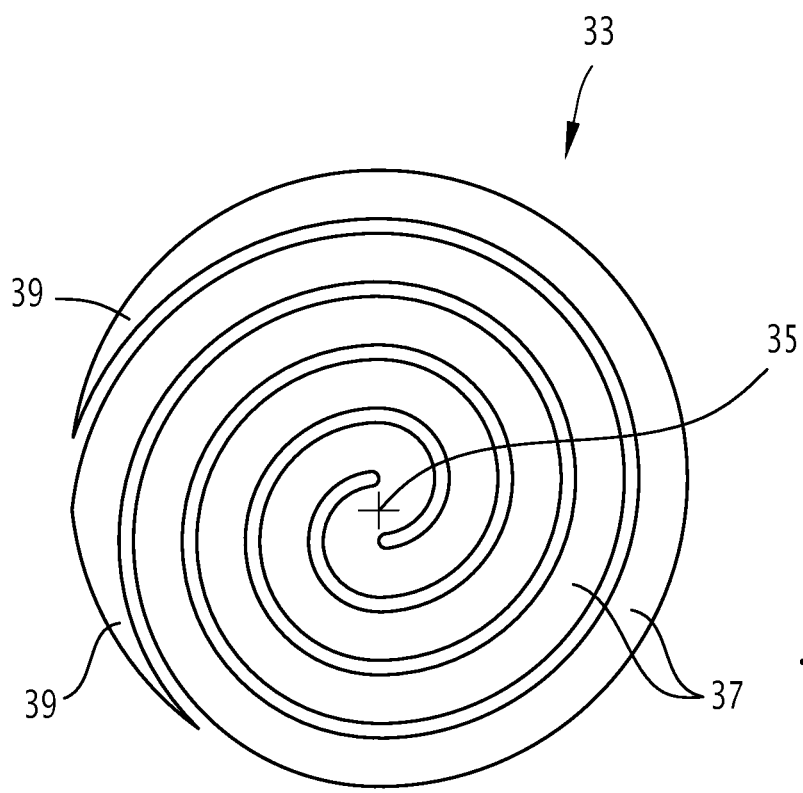
FIGS. 7 to 10 are top views of a heating plate according to different variants of the invention.

In the alternative embodiment shown in FIGS. 5 to 7, the heating plate 33 comprises exactly two branches 37.

In this case, each branch 37 winds at least over 360° around the solid center 35, preferably over at least over 540°, still more preferably over at least 720° around the solid center 35.

Having a large number of branches 37 contributes to obtaining a uniform temperature in the heating plate 33, and therefore to obtaining better heating of the exhaust gases.

This is shown by FIGS. 4 and 6, which show the temperature levels in two heating plates 33 during operation. The zones are graduated from (a) to (c), (a) corresponding to the lowest temperature and (c) to the highest temperature.

In FIG. 4, the heating plate 33 has four branches 37 each winding over about 360°. Two circumferentially adjacent branches 37 are connected to one of the poles of the power source, the other two branches being connected to the other pole of the power source.

In FIG. 6, the heating plate has two branches 37 each winding over about 360°. The two branches 37, in the center, are connected to one another by an S-shaped portion, with two switchbacks.

The electrical current flows as a general rule along the path offering the least electrical resistance, i.e., along the shortest path.

FIG. 6 shows that the branches 37 are relatively wide, and that the electrical current preferably flows along the concave side of the branches 37. A large part of the concave side of the branches 37 is in zone (b), while the convex side of the branches 37 is in zone (a). The journey of the current on the concave side is shorter than on the convex side.

FIG. 4 shows that the branches 37 are relatively narrow, since it is necessary to house four branches 37 in the section. The electrical current is distributed over the entire width of each branch 37. A large part of the branches 37 is in zone (b), both on the concave side and the convex side of the branches 37.

For a given number of branches 37, the same result can be achieved by reducing the width of the branches 37, and therefore increasing the length of the branches 37. Thus, the heating plate 33 of FIG. 7 includes two branches 37, like the heating plate 33 of FIG. 5, but the branches 37 are much longer and narrower there (more than 720°). The branches 37 of the heating plate 33 of FIG. 7 therefore have substantially the same width as those of FIGS. 2 to 4, such that the electrical current is distributed over the entire width of each branch 37.

Furthermore, FIG. 6 shows two particularly hot spots (zone (c)) at the two switchbacks of the S-shaped part of the heating plate 33. The electrical current "cuts out" along these switchbacks, which constitute the shortest journey to go from one branch 37 to another.

In FIG. 4, the size of the hot spots is lessened. Indeed, the electrical current arriving in the solid center 35 via an inner end 41 of a branch 37 tends to flow directly toward the branch 37 opposite it. A fairly small portion of the current flows toward the adjacent branch 37, which is at a different electrical potential, forming a hot spot similar to those of FIG. 6. The current flowing toward the branch 37 opposite it is distributed over the entire width of the branch 37. Thus, the higher the number of branches 37 connected to the solid center 35 is, the more the hot spots are lessened.

The power source 21 includes first and second terminals 43, 45 at first and second electrical potentials different from one another, and at least one electrically conductive support 47 rigidly fastened to an edge 49 of the heating plate 33, the support 47 being electrically connected to the free end 39 of at least one of the branches 37 and to the first terminal 43 of the power source 21.

The support 47 is rigidly fastened to the edge 49 of the heating plate 33 along one or several continuous pads, extending in total over at least 10% of a perimeter of the heating plate. Alternatively, the support 47 extends in total over at least 20%, or even at least 30%, of a perimeter of the heating plate 33.

The support 47 is typically fastened to half of the branches 37. Thus, when the heating plate 33 only includes two branches 37, the support 47 is fastened to only one branch 37, preferably along a continuous pad. When the heating plate 33 includes four branches 37, the support 47 is fastened to two branches 37 (FIG. 3). It is fastened to each branch 37 preferably along a continuous pad, the two continuous branches being separated by an interstice.

Considered in section perpendicular to the central axis C, the support 47 is inserted between the heating plate 33 and the tubular enclosure 15. It is rigidly fastened to the tubular enclosure 15 by electrically insulating fasteners, not shown in the Figures.

A connector 51 passes through the tubular enclosure 15 through an orifice of said tubular enclosure 15. A ring 53 electrically insulates the connector 51 of the tubular enclosure 15. The connector 51 provides the electrical connection of the support 47 to the first terminal 43 of the power source 21.

Advantageously, the power source 21 includes another electrically conductive support 55, rigidly fastened to the edge 49 of the heating plate 33. The other support 55 is electrically connected to the free end 39 of at least one other of the branches 37 and to the second terminal 45 of the power source 21.

The other support 55 is rigidly fastened to the edge 49 of the heating plate 33 along one or several continuous pads, extending in total over at least 10% of a perimeter of the heating plate 33. Alternatively, the other support 55 extends in total over at least 20%, or even at least 30%, of a perimeter of the heating plate 33.

The other support 55 is typically fastened to the other half of the branches 37, i.e., the other branches not electrically connected to the support 47. Thus, when the heating plate 33 only includes two branches 37, the other support 55 is fastened to only one branch 37, preferably along a continuous pad. When the heating plate 33 includes four branches 37, the other support 55 is fastened to two branches 37 (FIG. 3). It is fastened to each branch 37 preferably along a continuous pad, the two continuous branches being separated by an interstice.

Considered in section perpendicular to the central axis C, the other support 55 is inserted between the heating plate 33 and the tubular enclosure 15.

In the alternative embodiment of FIG. 3, the other support 55 is rigidly fastened to the tubular enclosure 15 by electrically insulating fasteners, not shown in the Figures.

Another connector 57 passes through the tubular enclosure 15 through another orifice of said tubular enclosure 15. A ring 58 electrically insulates the other connector 57 of the tubular enclosure 15. The other connector 57 provides the electrical connection of the other support 55 to the second terminal 45 of the power source 21.

In the alternative embodiment of FIG. 2, the other support 55 is rigidly fastened to the tubular enclosure 15 by electrically conductive fasteners 59. The tubular enclosure 15 is, for example, connected to the electric ground, and constitutes the second terminal 45 of the power source 21. Alternatively, the tubular enclosure 15 is electrically connected to the second terminal 45 of the power source 21.

Figure 11:
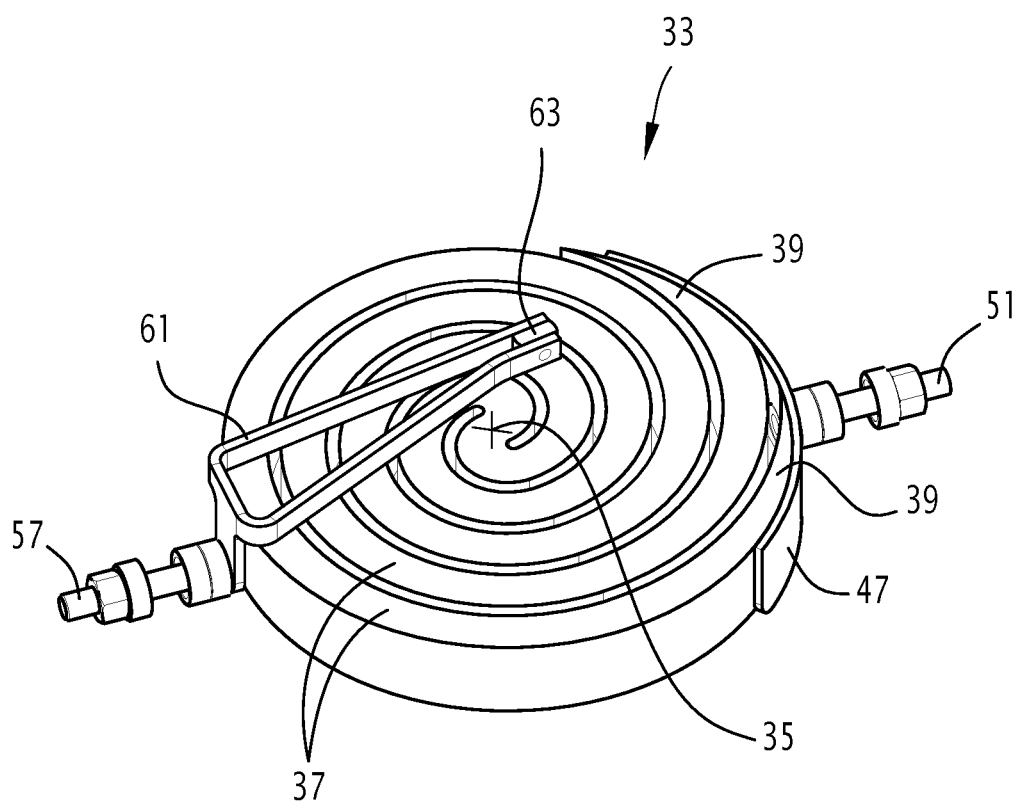
FIG. 11 is a perspective view of the heating member of FIG. 7, with another variant of the power source.

In the alternative embodiment of FIG. 11, the power source 21 includes an electrically conductive arm 61, directly electrically connected to the solid center 35 of the heating plate 33 or to a point of the heating plate 33 located near the solid center 35. The electrically conductive arm 61 is also electrically connected to one of the first terminal 43 or the second terminal 45 of the power source 21. The heating plate 33 is electrically connected to the other of the first terminal 43 or the second terminal 45, by the support 47 or the other support 55.

In the example shown in FIG. 11, the electrically conductive arm 61 includes an iron bent in a U, the ends of which are rigidly fastened to a small connecting plate 63, directly connected to a point of the heating plate 33. This point is preferably situated at equal distances from the free ends 39 of the branches 37, along said branches 37.

In reference to FIG. 3, the support 47 and the other support 55 advantageously encircle the heating plate 33. They keep the branches 37 in position. They stiffen the heating plate 33.

This contributes to allowing the heating plate 33 to be fastened only to the tubular enclosure 15. This fastening is typically done exclusively by the support 47 and the other support 55, or by one of the support 47 or the other support 55 plus the electrically conductive arm 61.

The heating member 19 is not directly fastened to the purification member 17.

Furthermore, an air knife remains around the heating plate 33, between the heating plate 33 and the tubular enclosure 15. This contributes to limiting the heat losses toward the outside of the tubular enclosure 15 and protecting the surrounding mechanical members.

The shape of the heating plate 33 can be modified based on the needs, in particular to create preferred heating zones: more pronounced heating in the center, at the periphery, etc.

Figure 8:
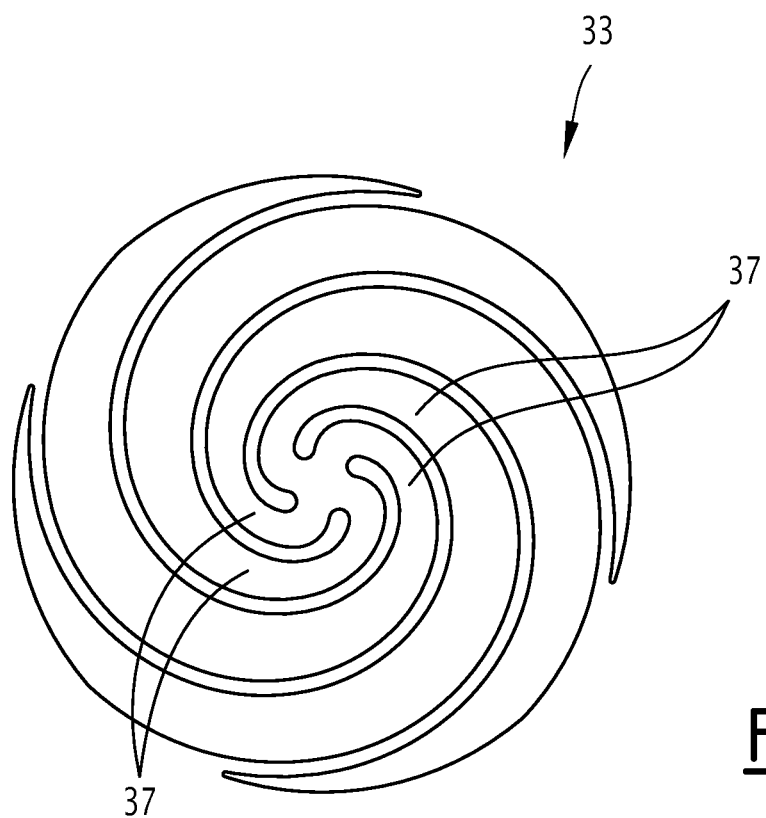

For example, according to an alternative embodiment illustrated in FIG. 8, the branches 37 do not have a constant width. Each branch 37 is, for example, wider at its opposite ends, and less wide in its central part.

Figure 9:
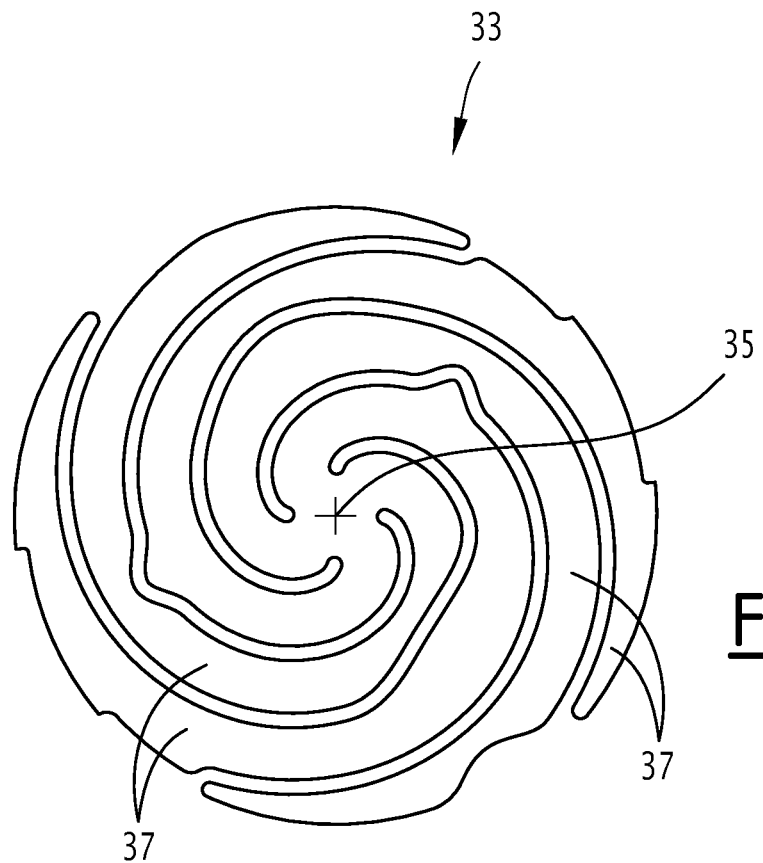

According to another alternative embodiment illustrated in FIG. 9, the branches 37 do not have a constant width. Each branch 37 is delimited by edges having protruding or hollow reliefs, which nest in the reliefs of the adjacent branches.

Figure 10:
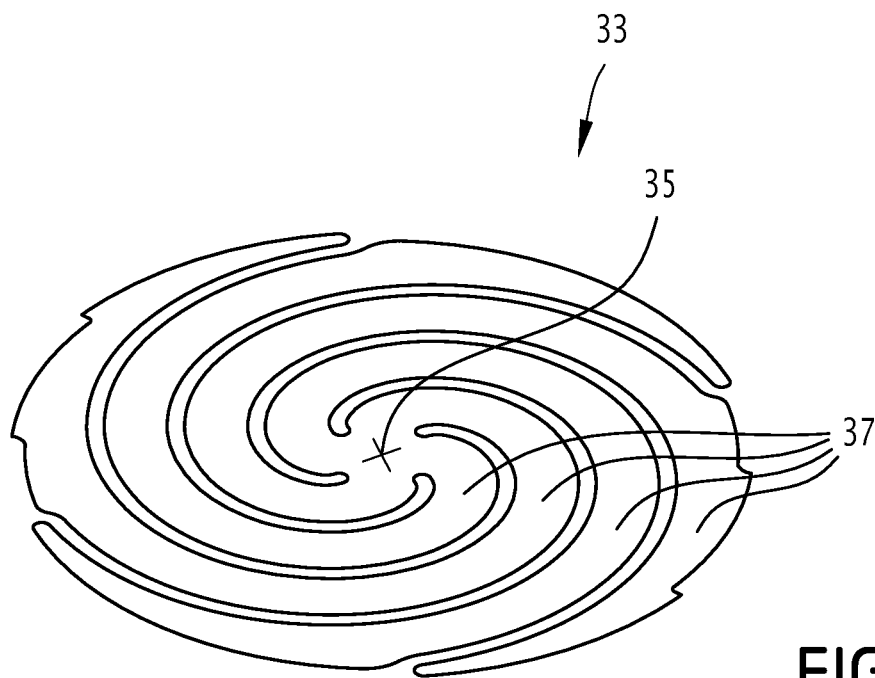

The heating plate 33 typically has a circular shape, taken perpendicular to the central axis C. In the alternative of FIG. 10, the heating plate 33 has an oval shape. Alternatively, the heating plate 33 has any other suitable shape.

The invention also relates to a method for manufacturing the purification device 1 described above. This manufacturing method includes the following steps:
  obtaining a plate made from said metal material;
  cutting the plate to form the heating plate 33.

The manufacturing method preferably also includes the following steps:
  assembling the heating member 19;
  mounting the purification member 17 and the heating member 19 in the tubular enclosure 15;
  electrically connecting the heating member 19 to the power source 21.

The step for assembling the heating member 19 is carried out by fastening the support 47 and the other support 55 to the heating plate 33. Alternatively, the step for assembling the heating member 19 is carried out by fastening the electrically conductive arm 61, and the support 47 four the other support 55, to the heating plate 33. The fastening operations are done by any suitable methods: gluing, welding, etc.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An exhaust gas purification device for a vehicle comprising:
  a tubular enclosure having a central axis;
  a purification member for exhaust gases housed in the tubular enclosure;
  an electric heating member housed in the tubular enclosure;
  a power source electrically powering the electric heating member, the electric heating member comprising a heating plate made from an electrically conductive material extending in a plane substantially perpendicular to the central axis, the heating plate having a solid center and branches, each branch extending in a spiral from the solid center to a free end located near the tubular enclosure, the heating plate being permeable to the exhaust gases and comprising a network of passages for the exhaust gas generating a turbulent flow of the exhaust gases through the heating plate; and
  wherein the power source includes first and second terminals, and at least one electrically conductive support rigidly fastened to an edge of the heating plate, the at least one electrically conductive support being electrically connected to the free end of at least one of the branches and the first terminal of the power source, and the at least one electrically conductive support being a plate extending against a side surface of the heating plate.

2. The device according to claim 1, wherein the branches comprise at least three branches each extending in a spiral from the solid center to a free end located near the tubular enclosure.

3. The device according to claim 1, wherein the heating plate is integrally formed.

4. The device according to claim 1, wherein the heating plate is a foam.

5. The device according to claim 1, wherein the heating plate has a thickness comprised between 2 and 50 mm.

6. The device according to claim 1, wherein the branches comprise exactly two branches, each branch winding over at least 360° around the solid center.

7. The device according to claim 1, wherein the branches comprise exactly four branches, each branch winding over at least 180° around the solid center.

8. The device according to claim 1, wherein the heating plate is coated with at least one coating with a catalytic function making it possible to contribute to post-treatment of the exhaust gases.

9. A method for manufacturing the exhaust gas purification device according to claim 1, the manufacturing process including the following steps:

providing the tubular enclosure, the purification member, the electric heating member, and the power source according to claim 1;

obtaining a plate to provide the electric heating member made from the electrically conductive material; and cutting the plate to form the heating plate.

10. A vehicle exhaust line, comprising the exhaust gas purification device according to claim 1.

11. The device according to claim 1, wherein the side surface of the heating plate comprises a side surface of the at least one of the branches of the heating plate.

12. The device according to claim 1, wherein the at least one electrically conductive support extends circumferentially and is parallel to the side surface of the heating plate.

13. The device according to claim 1, wherein the at least one electrically conductive support is rigidly fastened to the side surface of the heating plate along one or several continuous pads, extending in total over at least 10% of a perimeter of the heating plate.

14. The device according to claim 1, wherein the branches comprise at least four branches, the at least one electrically conductive support being fastened to half of the branches.

15. The device according to claim 1, wherein the at least one electrically conductive support is rigidly fastened to the tubular enclosure by electrically insulating fasteners.

16. The device according to claim 1, wherein the power source includes another electrically conductive support, rigidly fastened to the edge of the heating plate, the other electrically conductive support being a plate extending against another side surface of the heating plate, the other electrically conductive support being electrically connected to the free end of at least one other of the branches and to the second terminal of the power source.

17. The device according to claim 16, wherein the other side surface comprises a side surface of the at least one other of the branches of the heating plate.

18. The device according to claim 16, wherein the other electrically conductive support extends circumferentially and is parallel to the other side surface of the heating plate.

19. The device according to claim 16, wherein the other electrically conductive support is rigidly fastened to the other side surface of the heating plate along one or several continuous pads, extending in total over at least 10% of a perimeter of the heating plate.

20. The device according to claim 16, wherein the at least one electrically conductive support is fastened to half of the branches, and wherein the other electrically conductive support is fastened to the other half of the branches.

21. The device according to claim 16, wherein the other electrically conductive support is rigidly fastened to the tubular enclosure by electrically insulating or electrically conductive fasteners.

22. The device according to claim 16, wherein the at least one electrically conductive support and the other electrically conductive support encircle the heating plate.

23. The device according to claim 16, wherein the side surface of the heating plate comprises an outer peripheral side surface of the branches, and wherein inner surfaces of the at least one electrically conductive support and the other electrically conductive support directly contact the outer peripheral side surfaces of the branches.

* * * * *